March 12, 1957 T. R. JONES 2,784,429
RELEASABLE TAP HOLDER
Filed Sept. 10, 1953 3 Sheets-Sheet 1
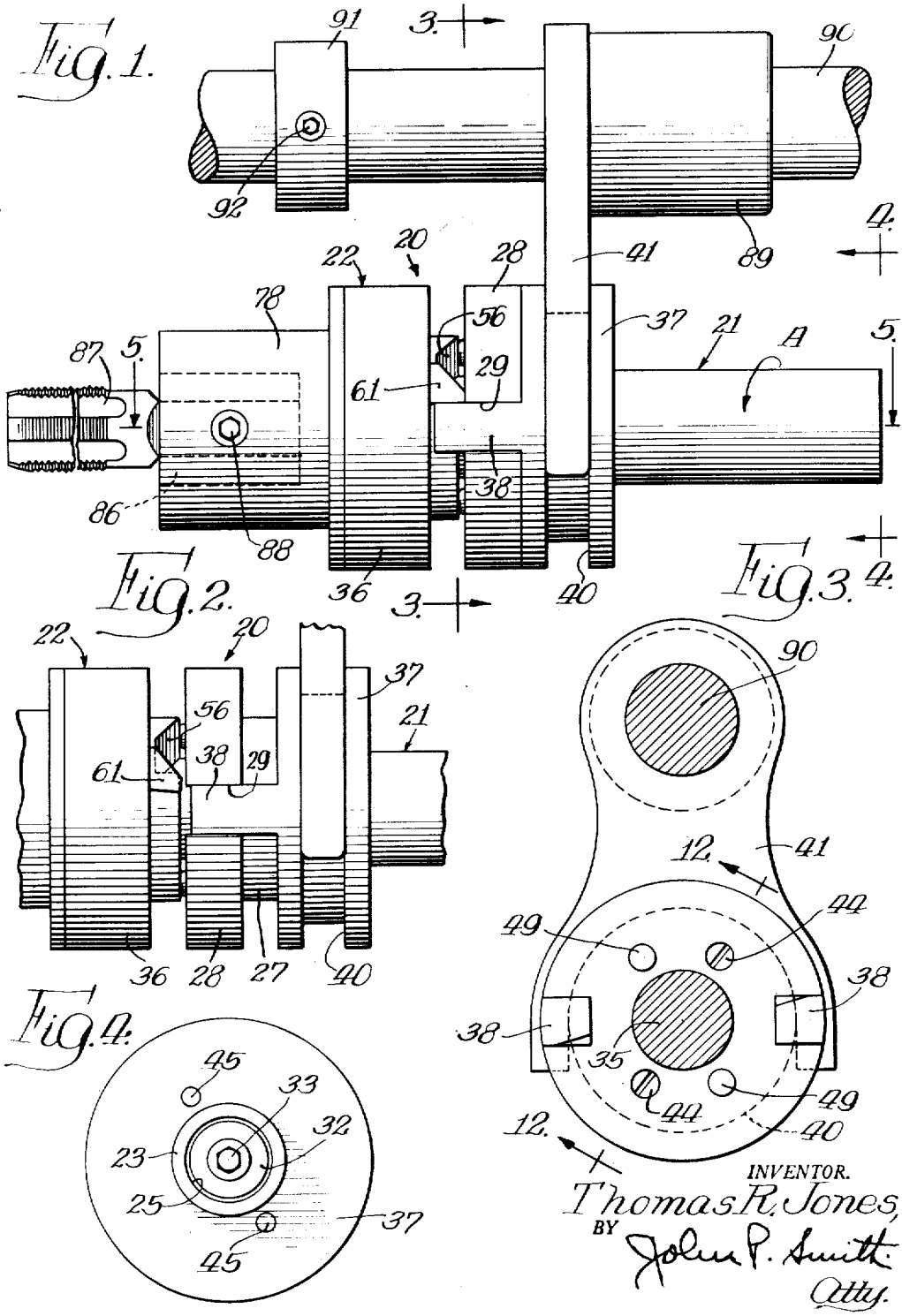
INVENTOR.
Thomas R. Jones,
BY John P. Smith
Atty.

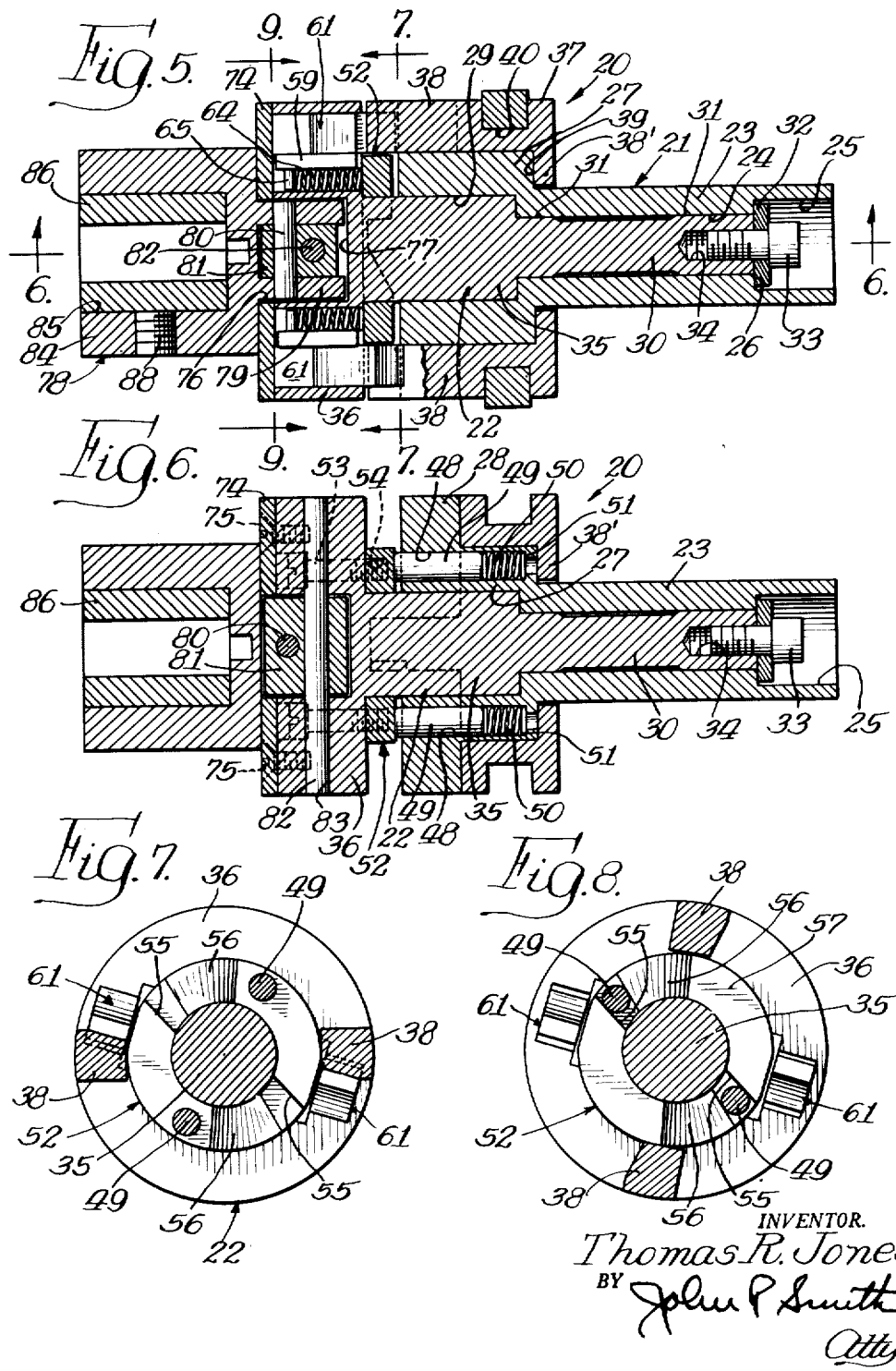

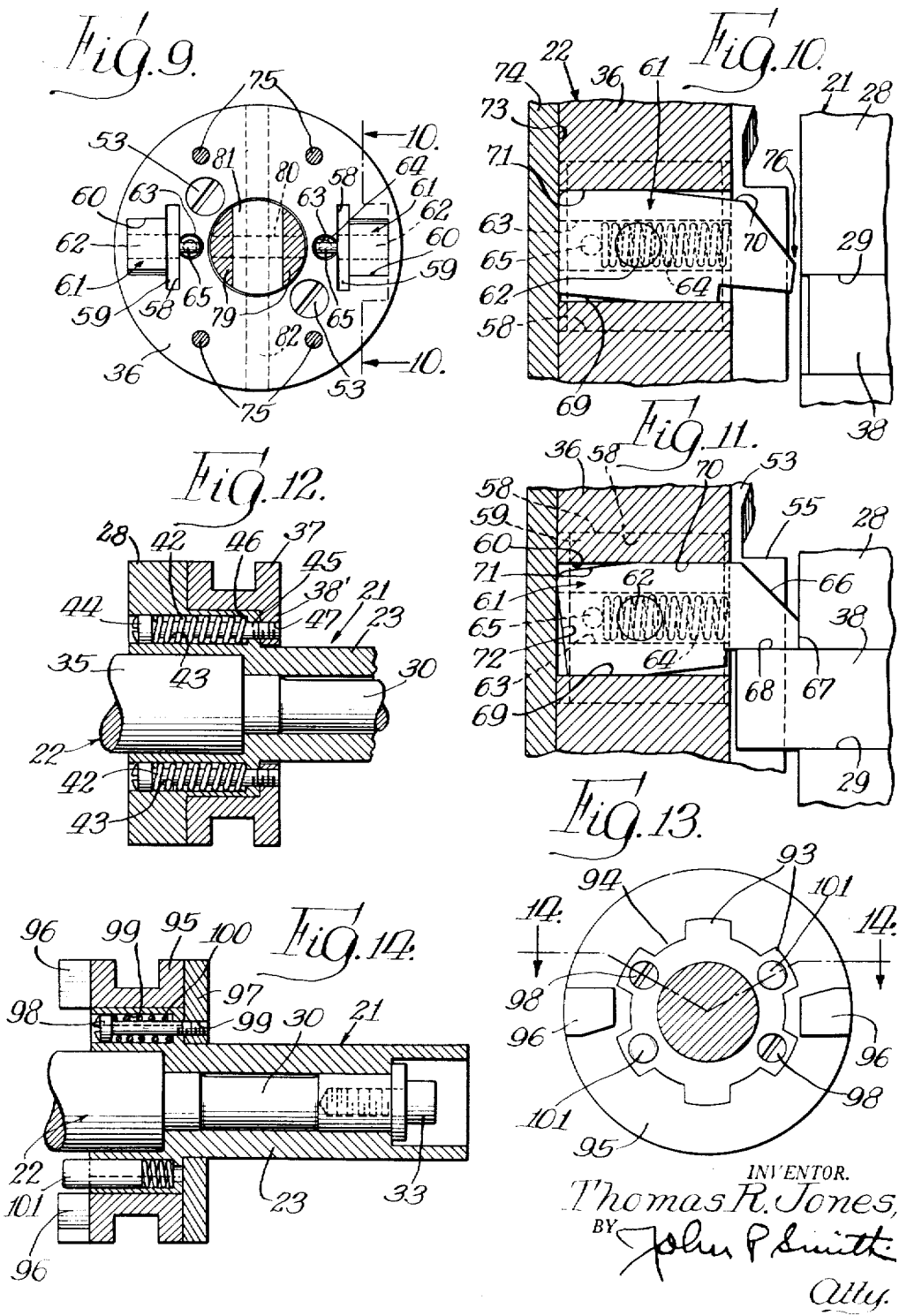

{ # United States Patent Office

2,784,429
Patented Mar. 12, 1957

2,784,429

RELEASABLE TAP HOLDER

Thomas R. Jones, Lewisburg, Ohio, assignor of one-fifth to John P. Smith, Oak Park, Ill.

Application September 10, 1953, Serial No. 379,424

4 Claims. (Cl. 10—129)

The present invention relates generally to tap holders, but more particularly to a novel and improved yoke operated releasing tap holder for multiple spindle automatic screw machines and the like of the type which are provided with friction clutch driven threading spindles.

In the type of automatic screw machines above referred to, both spindles revolve in the same direction of rotation, but the threading spindle revolves at a slower R. P. M. than the work supporting spindle during the threading operation to thereby cause the tap to cut the thread and screw itself into the work. After completion of the threading operation, the R. P. M. of the tap or threading spindle is increased to a speed in excess of that of the work spindle for the purpose of unscrewing the tap from the work. The two speeds of the threading spindle are accomplished by two friction clutches embodied in the conventional automatic screw machine and cams or dogs are employed to control the clutches. The present conventional type of releasing tap holder which stretches out or expands longitudinally during the threading operation and heretofore used in connection with the automatic screw machine above described, requires a special cam for each different threading job, thereby necessitating a multiplicity of cams.

It is therefore one of the primary objects of the present invention to provide a novel and improved tap holder which will not only overcome the disadvantages and objections hereinbefore pointed out, but will also provide a non-expandable and releasable tap holder in which a multiplicity of special cams heretofore required are eliminated.

A further object of the invention is to provide a novel and improved yoke operated releasable tap holder which requires only a single starter or kicker cam to advance the threading spindle or tap far enough in the direction of the work to let the tap engage the work.

A further object of the invention is to provide a novel and improved releasable tap holder in which the tap supporting or driven member is journaled in the shank or drive member of the holder and in which the shank or driving member and the tap supporting or driven member are immovable longitudinally with respect to each other.

A further object of the invention is to provide a novel and improved releasable tap holder in which the clutching means between the driven member and the drive member of the holder is controlled by the yoke, which is regular equipment of the automatic screw machine and whose function is familiar to the art.

A further object of the invention is to provide a novel and improved construction of tap holder in which the clutch dogs operatively connecting the drive and driven members together, reciprocate back and forth and torque-wise under certain operating conditions so that the driven member can revolve freely at a speed in excess of the drive member and with the speed of the work spindle and not cause excessive wear to either of the clutch members when the clutch is disengaged.

A still further object of the invention is to provide a novel and improved type of tap holder in which a simple floating construction operatively keeps the tap in parallel and radial alignment with the work in the forming of the thread and during withdrawal of the tap from the work.

These and other objects are accomplished by providing a construction and an arrangement of the various parts in the manner hereinafter described and particularly pointed out in the appended claims.

Referring to the drawings:

Fig. 1 is a side elevational view of my improved releasable tap holder in connection with a portion of a conventional automatic screw machine of the multiple spindle type;

Fig. 2 is a fragmentary side elevational view showing one position in which the clutch collar and its associated lugs have been disengaged from the driven dogs at the conclusion of the threading operation;

Fig. 3 is a cross-sectional view taken on the line 3—3 in Fig. 1;

Fig. 4 is a cross-sectional view taken on the line 4—4 in Fig. 1;

Fig. 5 is a longitudinal cross-sectional view taken on the line 5—5 in Fig. 1;

Fig. 6 is a longitudinal cross-sectional view taken on the line 6—6 in Fig. 5;

Fig. 7 is a cross-sectional view taken on the line 7—7 in Fig. 5;

Fig. 8 is a cross-sectional view similar to that shown in Fig. 7 except it shows the driving pins of the drive member engaging the camming lugs of the driven member for unscrewing the tap from the work;

Fig. 9 is a cross-sectional view taken on the line 9—9 in Fig. 5;

Fig. 10 is an enlarged fragmentary cross-sectional view taken on the line 10—10 in Fig. 9 showing one of the driving dogs disengaged from the driving lug of the driving member;

Fig. 11 is a similar fragmentary cross-sectional view showing one of the dogs engaging the driving lug of the driving member;

Fig. 12 is a cross-sectional view taken on the line 12—12 in Fig. 3;

Fig. 13 is a cross-sectional view of the modified form of driving member in which the yoke ring is splined to the driving member; and Fig. 14 is a longitudinal cross-sectional view taken on the line 14—14 in Fig. 13.

In illustrating one preferred form my improved releasable tap holder may assume in practice, I have shown the same as comprising the entire tap holder, generally indicated by the reference character 20. This holder 20 comprises two principal parts, a shank or drive member, generally indicated by the reference character 21 and a driven member, generally indicated by the reference character 22. The drive member 21 includes a cylindrical shank 23 which is adapted to be secured to the threading spindle of the automatic screw machine in a manner well understood in the art. The drive member 23 has a longitudinally extending bore 24 which terminates in a relatively larger bore 25 at the inner end thereof, forming a shoulder 26 therebetween. Formed integrally with the shank portion 23 of the drive member 21 is a relatively larger barrel portion 27. Formed integrally with and on the outer end of the barrel portion 27 is a peripheral flange or disc 28. Located in diametrically opposite portions of the disc 28 are longitudinally extending rectangular recesses 29 for the purpose hereinafter described. The barrel 27 is provided with a cylindrical recess 29′ concentric with and relatively larger in diameter than the bore 24. Journaled in the bores 24 and 29′ of the drive member 21 is the driven member 22. The driven member 22 has a shaft portion 30 journaled in and bearing on two spaced apart points 31 in the bore 24 of the shank 23. The driven member 22 is detachably retained in the drive member 23 by a washer 32 which engages the shoulder 26 and a machine screw 33 mounted in a threaded aperture 34 in the inner end of the shaft 30. Formed integrally with and on the outer end of the shaft 30 is a cylindrical portion 35 which normally seats in the cylindrical bore 29' of the drive member 21. Formed integrally with and on the outer end of the cylinder 35 is a peripheral disc 36. Longitudinally reciprocal and slidably mounted on the barrel 27 of the drive member 21 is a clutch or yoke ring 37. The yoke ring 37 is provided with two oppositely disposed and longitudinally extending rectangular driving lugs 38 which are adapted to reciprocate longitudinally in the opposite recesses 29 of the disc 28 of the drive member 21. (See Figs. 1, 2 and 5.) The yoke ring 37 is provided with an inwardly projecting annular flange 38' which is adapted to engage the shoulder 39 of the barrel 27 for limiting the outward movement of the ring 37 with respect to the drive member 21.

The ring 37 is provided with an annular peripheral recess 40 in which is adapted to be seated a fork or yoke member 41 of a conventional automatic screw machine, the function of which will hereinafter be more fully described. The yoke ring 37 and its associated drive lugs 38 are normally urged toward the disc 36 of the driven member 22 by oppositely disposed springs 42 mounted in longitudinally extending bores 43 in the disc 28 and barrel portion 27 of the drive member 21. The springs 43 engage the heads 44 of the screws 45 at one of their ends and the shoulders 46 at the other of their ends. The inner ends of the screws 45 are mounted in threaded engagement in the threaded apertures 47 in the annular flange 38'. (See Fig. 12 of the drawings.)

Mounted in oppositely disposed longitudinally extending bores 48 in the drive member 21 are spring actuated longitudinally reciprocal clutch pins 49. The pins 49 are normally urged outwardly by springs 50 which have one of their ends engage the pins 49 and the other of their ends seated on the shoulders as shown at 51. The clutch pins 49 are located in the path of and are adapted to engage an annular clutch cam, generally indicated by the reference character 52. This cam 52 is in the form of a ring encircling cylindrical portion 35 and is rigidly secured to the inner face of the disc 36 of the driven member 22 by oppositely disposed screws 53. These screws extend through suitable bores in the disc 36 and have their inner threaded ends engaged to threaded apertures 54 in the cam 52. (See Figs. 5 and 9 of the drawings.) The clutch cam 52 has two diametral opposite abrupt pin engaging faces 55 which are adapted to be engaged by the drive pins 49 of the drive member 21 only at the conclusion of the threading operation and after the driving lugs have been released from the driving dogs of the driven member 22 in the manner hereinafter more fully described. It may help at this time to explain, however, that these clutch pins 49 and clutch cam 52 only come into functional operation when the speed of the tap holder and its threading spindle is increased in R. P. M. to a speed in excess of that of the work spindle to unscrew the tap from the work at the conclusion of the thread cutting or threading operation. The cam 52 has gradually tapering off or inclined portions 56 and relatively flattened portions 47 so as to actuate the driven member 22 in one direction in unscrewing the tap from the work.

The disc portion 36 of the driven member 22 is provided with longitudinally extending oppositely disposed rectangular slots 58 in which are reciprocally mounted substantially square dog carriers or plates 59. Extending outwardly therewith are oppositely disposed and longitudinally extending rectangular slots 60 in which are mounted oppositely disposed clutch dogs, generally indicated by the reference character 61. The dogs 61 are pivoted on outwardly projecting pins 62 which are secured to and in the approximate center of the plates 59. Positioned adjacent the slots 58 and extending thereinto are oppositely disposed longitudinally extending bores 63 in the disc 36 in which are mounted springs 64. One end of each of the springs engage laterally extending pins 65 which project into the bores 63 and are secured to one end of each of the plates 59. The other ends of the springs 64 engage and are retained in their respective bores by the adjacent face of the cam member 53. (See Figs. 9 to 12 inclusive.) The clutch dogs 61 have a plurality of angular edges, all essential to their functional operation. The inner ends of the dogs 61 are provided with tapered portions 66, flat portions 67 and lug engaging portions 68 which are adapted to be engaged by the lugs 38 of the yoke ring 33 for driving the driven member 22. The opposite edges 69 and 70 of the dogs 61 are located in planes parallel to one another so that when the driving lugs 38 engage the dogs in the position shown in Fig. 11 of the drawings, the edges 69 and 70 engage the opposite walls of the slots 60 to form stops for the dogs. The edges 71 of the dogs 61 occupy planes approximately six degrees offset from the planes of the edges 70. The planes of the outer edges 72 are at right angles to the planes of the edges 71. The edges 69, 70, 71 and 72 of the dogs form in effect camming portions or edges for controlling or limiting the torque-wise movement of the dogs.

From the above description it will be obvious that these clutch dogs 61 may reciprocate longitudinally in their respective recesses 58 and move torque-wise on the pivot pins 62 when pressure is exerted on or released from the dogs by the drive lugs 38. It will be noted from Fig. 10 of the drawings that when the driving lugs 38 are withdrawn to disengage the drive member 21 from the driven member 22, the springs 64 urges the pins 65 and the plates 59 longitudinally in their recesses 58 and thereby cause the dogs 61 to move slightly longitudinally and turn torque-wise on their respective pivots on the pins 62. In this movement the dogs 61 are actuated from the position shown in Fig. 11 of the drawings (the clutch engaging position) to the position shown in Fig. 10 of the drawings (the clutch disengaging position). In this position the edges 71 and 72 contact respectively the side walls of the slots 60 and the inner face 73 of a cover disc 74. This longitudinal and torque-wise movement of the dogs 61 causes the ends 67 of the dogs to be spaced from the disc 28 of the drive member 21 and spaced from the drive lugs 38 as indicated at 76 in Fig. 10 of the drawings. Thus when the clutch members are disengaged, the driving lugs and clutch dogs are sufficiently spaced apart to permit the tap and driven member to rotate freely with the work and thereby eliminate clicking or excessive wear on any of the clutch operating parts. The cover disc 74 is secured to the outer face of the disc 36 of the driven member 22 by four spaced apart screws 75.

Mounted in aligned circular recesses 76 and 77 in the respective cover plate 74 and disc 36 of the driven member 22 is a tap holder sleeve, generally indicated by the reference character 78. The sleeve 78 is provided with arcuate spaced apart lugs 79 on its inner end which conforms to and loosely fits into the cylindrical recesses 76 and 77 of the discs 74 and 36 respectively. Positioned between and pivoted to the arcuate lugs 79 by means of a transverse pin 80 is a block 81. The block 81, in turn, is pivoted on a pin 82 which extends through and is positioned in close proximity to and at right angles to the pin 80. The pin 82 extends diametrally through a transverse aperture 83 in the disc 36 and is secured therein in any well known manner. The sleeve 78 is provided with a relatively larger barrel 84 which has a cylindrical recess 85 on its outer end. Mounted in the recess 85 is a longitudinally split sleeve 86 in which a tap 87 may be inserted and secured therein by a set screw 88. The fork or yoke 41 is formed integrally with a bearing barrel 89 which is slidably and longitudinally movable on a shaft 90 of the conventional automatic screw machine. Adjustably mounted on the shaft 90 is a collar 91 which serves as a stop to engage the fork or yoke 41 and thereby stops or withdraws the yoke ring 37 and its associated lugs 38 from the clutch dogs 61 to disengage the drive member 22 at the conclusion of the threading operation. In this connection it will be noted that the collar 91 can be longitudinally adjusted on the shaft 90 and secured in position by a set screw 92 so that any predetermined depth of thread may be cut in the work.

In the modified form of the invention shown in Figs. 13 and 14 of the drawings, the drive member 21 is provided with spaced apart splines 93 which engage complementary internal splines 94 in the yoke ring 95. The yoke ring 95 in this modified form has formed integrally therewith oppositely disposed drive lugs 96. Secured to the ring 95 on the inner side thereof is a washer 97. Oppositely disposed screws 98 are mounted in bores 99 of the drive member 21. The inner threaded ends of the screws 98 are secured in threaded apertures 99 of the washer 97. Springs 100 encircling the screws 98 normally urge the lugs 96 and yoke ring 95 outwardly toward the clutch dogs 61 (shown in other figures). Oppositely disposed spring pressed clutch pins 101 mounted in the drive member 21 normally urge these pins into engagement with the clutch cam 52. It will be obvious that the modified construction disclosed in Figs. 13 and 14 of the drawings is adapted to function and operate in connection with the other parts of the tap holder disclosed in Figs. 1 to 12 inclusive.

Summarizing the advantages and function of operation of my improved yoke operated releasing tap holder, it will be understood that the driven member 22 is journaled in the drive member 21 and these members are immovable longitudinally with respect to one another. When the conventional kicker cam of the automatic screw machine initially starts the tap into the work, the work spindle and the threading spindle which holds the tap holder are revolving in the same direction, or the direction indicated at "A" in Fig. 1 of the drawings, with the threading spindle operating at a relatively slower R. P. M. than the work spindle. This slower R. P. M. of the threading spindle causes the tap to cut the thread in the work. When the yoke or fork 41 strikes the stop collar 91, the yoke ring 37 with its driving lugs 38 will be withdrawn from the clutch dogs 61 to disengage the drive member 21 from the driven member 22 and permit the driven member to rotate freely with and at the increased speed of the work spindle. When the threading operation is completed, the second conventional friction clutch of the automatic screw machine is thrown into operation which increases the R. P. M. of the threading spindle and tap holder to unscrew the tap from the work.

It will be further understood that by adjusting the collar or stop 41 on the shaft 90, different depth of threads in the work may be secured. This novel tap holder eliminates the necessity of requiring a plurality of cams for each different threading operation and also insures accuracy of threading and depth of threads in the production of threaded pieces of work. It will be further observed that the construction of this novel tap holder is such that the same may be easily assembled or dismantled and that the number of operating parts are reduced to a minimum.

While in the above specification I have described one embodiment which my invention may assume in practice, it will, of course, be understood that the same is capable of modification and that modification may be made without departing from the spirit and scope of the invention as defined by the appended claims.

What I claim as my invention and desire to secure by Letters Patent is:

1. A tap holder comprising a drive member, a driven member journaled on said drive member, said driven member being immovable longitudinally with respect to said drive member, clutch dogs mounted on said driven member and engageable with said drive member, means carried by said driven member for oscillatably supporting said clutch dogs on axes transverse to the longitudinal axis of said driven member and permitting said clutch dogs to move bodily longitudinally with respect to said driven member, means including springs carried by said driven member and operatively related to said dogs for urging said dogs longitudinally in one direction, camming portions formed on said dogs and engageable with said driven member and cooperating with said springs for actuating said dogs torque-wise in one direction with respect to said driven member to cause said dogs to withdraw from said drive member when declutched, a yoke ring mounted on said drive member, lugs carried by said ring for splining said ring to said drive member, and means including a stop positioned adjacent said ring for actuating said ring and disengaging said drive member from said driven member.

2. A tap holder comprising a drive member, a driven member journaled on said drive member, said driven member being immovable longitudinally with respect to said drive member, there being longitudinal slots in said driven member, carriers movably mounted in said slots, clutch dogs pivoted to said carriers on axes transverse to the longitudinal axis of said drive and driven members, springs mounted on said driven member and engageable with said carriers for urging said dogs longitudinally in one direction with respect to said driven member, camming portions formed on said dogs and engageable with the walls of said slots and cooperating with said springs for actuating said dogs about their respective pivots and longitudinally to cause said dogs to withdraw from said drive member when declutched, a yoke ring mounted on said drive member and splined thereto, lugs carried by said ring and engageable with said dogs, means carried by said drive member normally urging said ring toward said driven member, and means including a stop positioned adjacent said ring for actuating said ring and disengaging said drive member from said driven member.

3. A tap holder comprising a drive and driven member, one of said members journaled on the other member, clutch means between said members for resisting the torque exerted on the driven member in one direction of rotation by the work being tapped, said clutch means including carriers mounted and longitudinally movable with respect to said driven member, dogs pivoted to said carriers on axes transverse to the longitudinal axis of said drive and driven members, means including spring carried by said driven member and operatively related to said dogs for urging said dogs in one direction longitudinally, camming means between said dogs and said driven member and cooperating with said springs to actuate said dogs torque-wise in one direction with respect to said driven member to cause said dogs to withdraw from said drive member when declutched, and a second clutch means between said members responsive to the disengagement of the first named clutch means for permitting said driven member to rotate freely at an excess R. P. M. with respect to the drive member.

4. A tap holder comprising a drive member, a driven member journaled in said drive member, and a clutch means between said members including a plate mounted on said driven member and movable longitudinally with respect thereto, a dog pivoted to said plate on an axis at right angles to the longitudinal axis of said drive and driven members, a spring carried by said driven member and operatively related to said dog whereby said dog is urged longitudinally in one direction, and camming means between said dog and driven member and cooperating with said spring means to actuate said dog torquewise in one direction to cause said dog to withdraw from said drive member when declutched.

References Cited in the file of this patent

UNITED STATES PATENTS

| | | | |
|---|---|---|---|
| 796,205 | Graham | Aug. 1, 1905 |
| 1,045,598 | Oatman | Nov. 26, 1912 |
| 1,254,933 | Peuch | Jan. 29, 1918 |
| 1,290,427 | Velk | Jan. 7, 1919 |
| 1,425,226 | Whitman | Aug. 8, 1922 |
| 2,549,972 | Jones | Apr. 24, 1951 |
| 2,591,291 | Raymond | Apr. 1, 1952 |